(12) United States Patent
Caldwell, II

(10) Patent No.: US 7,498,770 B1
(45) Date of Patent: Mar. 3, 2009

(54) LOAD CONTROLLED BATTERY CHARGING DEVICE

(75) Inventor: William S. Caldwell, II, Homestead, FL (US)

(73) Assignee: Caldwell-Lazer, Inc., Miami, FL (US)

( * ) Notice: Subject to any disclaimer, the term of this patent is extended or adjusted under 35 U.S.C. 154(b) by 276 days.

(21) Appl. No.: 11/098,748

(22) Filed: Apr. 4, 2005

Related U.S. Application Data

(63) Continuation-in-part of application No. 10/877,185, filed on Jun. 28, 2004, now abandoned.

(51) Int. Cl.
*H02J 7/00* (2006.01)
*H02J 7/02* (2006.01)
*H02J 7/04* (2006.01)

(52) U.S. Cl. ............... 320/125; 320/111; 320/137; 320/155; 320/157; 320/162

(58) Field of Classification Search ............ 320/137, 320/155, 162, 111, 157, 125
See application file for complete search history.

(56) References Cited

U.S. PATENT DOCUMENTS

| | | | |
|---|---|---|---|
| 4,052,656 A | 10/1977 | Lavell et al. | |
| 5,237,259 A * | 8/1993 | Sanpei | 320/158 |
| 5,367,244 A | 11/1994 | Rose et al. | |
| 5,371,456 A | 12/1994 | Brainard | |
| 5,432,428 A | 7/1995 | Meadows et al. | |
| 5,608,307 A * | 3/1997 | Garrett et al. | 320/163 |
| 5,617,007 A | 4/1997 | Keidl et al. | |
| 5,656,916 A | 8/1997 | Hotta | |
| 5,721,481 A * | 2/1998 | Narita et al. | 320/111 |
| 6,172,477 B1 * | 1/2001 | Kim | 320/114 |
| 6,288,522 B1 | 9/2001 | Odaohhara et al. | |
| 6,291,972 B1 * | 9/2001 | Zhang | 320/118 |
| 6,720,676 B2 * | 4/2004 | Hasegawa et al. | 307/85 |
| 2003/0038612 A1 * | 2/2003 | Kutkut | 320/140 |

OTHER PUBLICATIONS

William Sloot, Versatile power-supply load uses light bulbs, Feb. 7, 2002, EDN magazine, pp. 102 and 104.*

* cited by examiner

*Primary Examiner*—Akm E Ullah
*Assistant Examiner*—Johali A Torres Ruiz
(74) *Attorney, Agent, or Firm*—Malloy & Malloy, P.A.

(57) ABSTRACT

A load controlled battery charging device is provided which is structured to apply an electrical charge to a plurality of rechargeable storage batteries having a wide range of voltage output capacities. The device includes an electrical charging circuit having an input connection to a power source to provide the power required to permit recharging the batteries. The load controlled charging device also includes a load bank structured to draw a substantially constant electrical current from the power input, and may include a rectifier to convert an alternating current power supply to a direct current to be applied to the rechargeable storage batteries. Additionally, the load controlled battery charging device includes a charging current output connection structured to interconnect the electrical charging circuit to the rechargeable storage battery, at least during the charging operation.

8 Claims, 2 Drawing Sheets

LOAD CONTROLLED BATTERY CHARGING DEVICE

CLAIM OF PRIORITY

The present application is a continuation-in-part patent application which claims priority to the non-provisional patent application having Ser. No. 10/877,185, filed on Jun. 28, 2004, now abandoned which is incorporated herein by reference.

BACKGROUND OF THE INVENTION

1. Field of the Invention

The present invention is directed to a load controlled battery charging device structured to apply a charge to a rechargeable storage battery having any one of a wide range of voltage output capacities. The load controlled battery charging device utilizes a load bank disposed in series with a power supply and a rechargeable storage battery, wherein a charging current applied to the rechargeable storage battery is controlled via a substantially constant electrical current drawn by the load bank.

2. Description of the Related Art

As the number of portable electronic devices available for communication, entertainment, and even transportation become increasingly available, the interest in providing portable energy sources for such devices also increases. In particular, efficient, effective, and economical devices to renew or recharge such portable energy sources, for example, rechargeable storage batteries, are of utmost interest and importance today.

The devices presently available to recharge such "rechargeable" batteries are typically structured to control a charging voltage to be applied to the rechargeable storage battery. While these devices may be effective in recharging such batteries, they are also typically specialized devices and may only be utilized for a small range of rechargeable storage batteries having the same or similar voltage output capacities. For example, a charging device structured for use with a 12 volt DC or 24 volt DC storage battery, such as may be used in an automobile, truck, or marine vehicle, are not readily adaptable for use with smaller storage batteries, such as the "AAA", "C", or "D" type batteries utilized in many portable electronic devices, much less the rechargeable storage batteries utilized to power the smallest portable electronic devices such as cellular telephones, PDA's, and digital cameras, just to name a few.

Additionally, the devices presently available typically require a complex and expensive array of electronic components to provide an electrical charging circuit to convert a standard power input, such as a 110/220 volt alternating current supply which is readily available worldwide, to a specific charging output current and voltage which may be utilized to charge a rechargeable storage battery in a reasonable time without danger of "overcharging", and irreparably damaging the storage battery, the portable electronic device in which it is installed, or both. The present devices generally incorporate a transformer to convert and control an input voltage, and thereby indirectly control a specific charging current output to a rechargeable storage battery. As such, transformers inherently limit the range of applicability of present devices relative to an output voltage of a specific rechargeable storage battery with which it may be utilized.

Thus, there exists a need for a battery charging device that may be utilized to charge rechargeable storage batteries having a wide range of output voltage capacities, such as the low voltages utilized to power the most delicate portable electronic devices to the high voltage output of the banks of rugged marine batteries utilized to operate high speed racing boats, and beyond. It would be beneficial for such a charging device to permit variable control of a charging current to be applied to a rechargeable storage battery to accommodate a wide range of output voltage capacities of such batteries. Further, it would be preferable for any such charging device to operate without a transformer to eliminate the output voltage range limitations inherent therein. More in particular, it would be helpful to provide a charging device which permits variable control of a charging current in an efficient, effective, and economical manner.

SUMMARY OF THE INVENTION

The present invention is directed to a load controlled battery charging device structured to apply an electrical charge to a rechargeable storage battery. More in particular the present invention is structured such that the load controlled battery charging device may be utilized to recharge any of a plurality of rechargeable storage batteries having a wide range of output voltage capacities.

The load controlled battery charging device includes an electrical charging circuit comprising a series configuration and having an input connection to a power supply. The power supply utilized by the present invention may comprise either a direct current or an alternating current source of power. The load controlled battery charging device of the present invention is structured to charge any rechargeable storage battery having an output voltage less than a peak voltage of the power supply.

In at least one embodiment, the electrical charging circuit of the load controlled battery charging device comprises a rectifier interconnected in the series configuration with the power supply. The rectifier may be a half wave rectifier or a full wave rectifier, and is structured to provide a direct current charging supply, in particular when the power supply comprises an alternating current power supply.

Additionally, the load controlled battery charging device includes a load bank interconnected in the series configuration of the electrical charging circuit. The load bank is structured to draw a substantially constant electrical current from the power supply within a predetermined electrical current range. More in particular, the predetermined electrical current range corresponds to the range of voltage output capacities of the rechargeable storage batteries which may be efficiently, economically, and effectively recharged by the load controlled battery charging device of the present invention. In at least one embodiment, the present invention employs a variable capacity load bank being structured to draw a plurality of substantially constant electrical currents from the power supply within the predetermined electrical current range.

The load controlled battery charging device of the present invention also includes a charging current output connection which is structured to interconnect the electrical charging circuit to the rechargeable storage battery to permit recharging thereof.

These and other objects, features and advantages of the present invention will become more clear when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
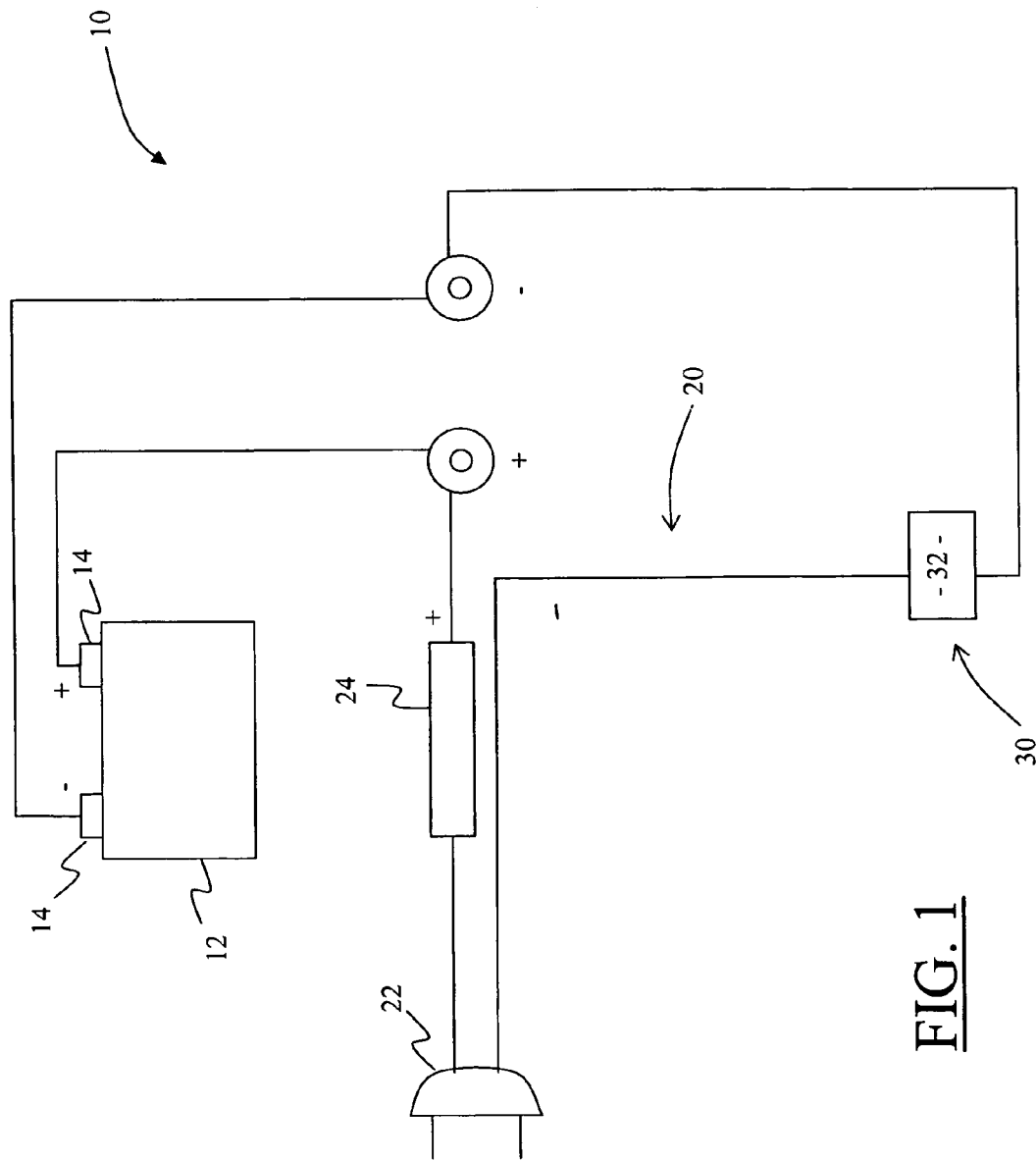
FIG. 1 is a schematic representation of one preferred embodiment of a load controlled battery charging device of the present invention.

As stated above, the present invention is directed to a load controlled battery charging device, generally as shown in the figures as at 10. More in particular, the load controlled battery charging device 10 of the present invention is structured so as to efficiently, effectively, and economically apply a charge to a rechargeable storage battery 12.

The load controlled battery charging device 10 includes an electrical charging circuit 20 having an input connection 22 structured to receive power from a power supply. In at least one embodiment, the power supply may comprise a standard 110 or 220 volt household electrical power supply, in which case, the input connector 22 comprises a standard 110 or 220 volt plug. Further, in this embodiment, the electrical charging circuit 20 is structured to convert the alternating current household power supply to a direct current charging supply for application to the rechargeable storage battery 12, as discussed in greater detail below. Of course, it is within the scope and intent of the present invention for the power supply to comprise other sources such as, by way of example only, an electrical generator, which may provide either an alternating current or a direct current power source, or a separate storage battery or batteries.

In a preferred embodiment, the electrical charging circuit 20 comprises a series configuration, as illustrated in the figures. As further shown in the figures, the rechargeable storage battery 12 is preferably interconnected to the electrical charging circuit 20 in the series configuration. To facilitate the interconnection of the rechargeable storage battery 12, the load controlled battery charging device 10 of the present invention comprises at least one connector, also disposed in the series configuration of the electrical charging circuit 20. In one preferred embodiment, the load controlled battery charging device 10 comprises a plurality of connectors, in particular, one connector for each of the positive and negative terminals 14 of the rechargeable storage battery 12. In this preferred embodiment, the connectors may comprise electrically shielded clips, for example, alligator clips, to securely and electrically interconnect the rechargeable storage battery 12 to the electrical charging circuit 20. Alternatively, the connector may comprise a plug type of connection as may be interconnected to many portable electronic devices, such as cellular telephones, compact disc players, etc., the plug being structured to contact at least one terminal 14 of a rechargeable storage battery 12 to permit the direct current charging supply to be applied thereto.

As previously stated, the power supply, in at least one embodiment, comprises an alternating current power supply. As such, the load controlled battery charging device 10 is structured to convert the alternating current power supply to a direct current charging supply for application to a rechargeable storage battery 12. As illustrated in the preferred embodiments of FIGS. 1 and 2, the load controlled battery charging device 10 of the present invention comprises a rectifier 24, interconnected in the series configuration of the electrical charging circuit 20. The rectifier 24 may comprise a full wave rectifier comprising a plurality of diodes, more specifically, the full wave rectifier may comprise four (4) diodes structured to convert the incoming alternating current power supply to the direct current charging supply. In one preferred embodiment, however, the rectifier 24 comprises a half wave rectifier comprising a single diode. The utilization of a half wave rectifier is preferred so as to minimize the potential of an electrical shock to an operator of the load controlled battery charging device 10.

Figure 2:
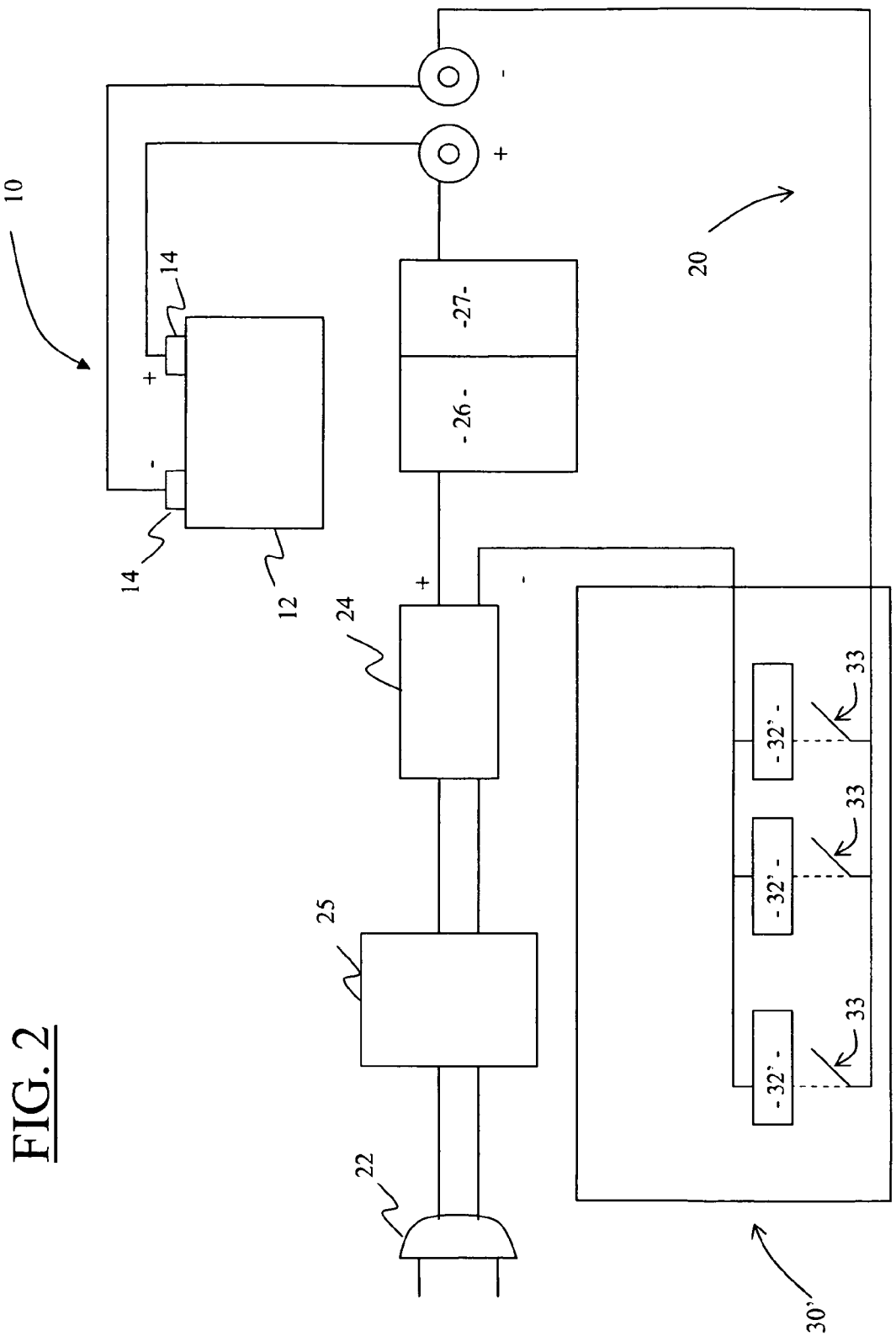
FIG. 2 is a schematic representation of one further preferred embodiment of a load controlled battery charging device of the present invention.

In the preferred embodiment illustrated in FIG. 2, the electrical charging circuit 20 may further comprise a polarity testing unit 25 to assure that the input connection 22 is connected to the power supply with the correct line polarity, once again, to reduce the potential of an electrical shock to the operator of the present invention. The polarity testing unit 25 may comprise a ground fault breaker or, in at least one embodiment, a relay structured such that the electrical charging circuit 20 will not be energized unless the interconnection with the power supply is made with the proper polarity.

As illustrated in FIG. 1, the load controlled battery charging device 10 of the present invention further comprises a load bank 30 interconnected to the electrical charging circuit 20 in the series configuration. The load bank 30 is structured to draw a substantially constant electrical current from the power supply, within a predetermined electrical current range, regardless of the capacity of the power supply. In this manner, the electrical current within the electrical charging circuit 20, and more importantly, the electrical current applied to a rechargeable storage battery 12 interconnected to the electrical charging circuit 20 may be readily and accurately controlled.

More in particular, the load bank 30 of the present invention comprises at least one load element 32 structured to draw a substantially constant electrical current from the power supply within the predetermined electrical current range. The predetermined electrical current range is at least partially defined by the electrical current capacities of various load elements 32 which may be utilized in the load bank 30 of the present invention. More importantly, the predetermined electrical current range corresponds to the range of voltage output capacities of a plurality of rechargeable storage batteries 12 which may be efficiently, economically, and effectively recharged by the load controlled battery charging device 10 of the present invention.

In a preferred embodiment, the load element 32 does not require sine wave alternating current. In at least one embodiment, the load element 32 comprises a standard incandescent light bulb, however, it is within the scope and intent of the present invention for the load element 32 to comprise a heating element, or other such element. Thus, the electrical current applied to a rechargeable storage battery 12 interconnected to the electrical charging circuit 20 of the present invention is determined by the current required by the load element 32. Furthermore, the electrical current applied to the rechargeable storage battery 12 by the present invention may be varied within the predetermined electrical current range by utilizing a load element 32 which will draw a greater or lesser, yet substantially constant, electrical current from the power supply. As will be understood from the foregoing, the load controlled battery charging device 10 of the present invention may be utilized to recharge an electrical device which draws a substantially constant electrical current and/or that operates with a substantially constant electrical load.

In one further preferred embodiment, and as illustrated in FIG. 2, the load controlled battery charging device 10 of the present invention comprises a variable load bank 30'. Similar to load bank 30 as described above, the variable load bank 30' is interconnected to the electrical charging circuit 20 in the series configuration and is structured to draw a substantially constant current from the power supply, within a predetermined electrical current range, regardless of the capacity of the power supply. Additionally, the variable load bank 30' is structured to comprise at least one, but preferably, a plurality of load elements 32'. FIG. 2 illustrates that while the variable load bank 30' is interconnected to the electrical charging circuit 20 in the series configuration, the plurality of load elements 32' of the variable load bank 30' are interconnected in a parallel configuration relative to one another. In this manner, the current draw of each of the plurality of load elements 32 are added to one another to collectively determine the substantially constant current drawn by the variable load bank 30', and further, the plurality of load elements 32' interconnected in the parallel configuration at least partially defines the predetermined electrical current range of this preferred embodiment.

As the electrical current to be applied to the rechargeable storage battery 12 is determined by the total current required by the plurality of load elements 32', this electrical current may be varied within the predetermined electrical current range by utilizing one or more load elements 32' which will draw a greater or lesser, yet substantially constant, electrical current from the power supply. Alternatively, one or more load elements 32' may be added or removed from the variable load bank 30' thereby varying the electrical current drawn by the load bank 30' and subsequently applied to the rechargeable storage battery 12. The addition or removal of one or more load elements 32' may comprise the physical addition or removal of the load element 32' from the variable load bank 30'. Alternatively, the variable load bank 30' may comprise one or more switches 33 structured to facilitate the addition or removal of one or more of the load elements 32' to or from the parallel circuit configuration without requiring the physical addition or removal of the load elements 32' from the variable load bank 30', thereby increasing or decreasing, respectively, the current drawn by the variable load bank 30' in an economical, efficient, and effective manner. As represented in FIG. 2, each of the one or more switches 33 are selectively disposed between an open circuit position and a closed circuit position, respectively represented in solid and phantom lines.

In addition to the variable load bank 30', FIG. 2 illustrates an embodiment of the load controlled battery charger 10 comprising a timer 26 interconnected in the series configuration of the electrical charging circuit 20. The timer 26 is structured to measure and detect the passage of a preselected charging period, the duration of the charging period being determined by an operator of the device 10 based upon the charging requirements of the rechargeable storage battery 12 interconnected thereto. Additionally, the timer 26 is structured to open the electrical charging circuit 20 upon passage of the preselected charging period, thereby terminating the application of the direct current charging supply to the rechargeable storage battery 12.

FIG. 2 further illustrates an amp meter 27 interconnected in the series configuration of the electrical charging circuit 20. The amp meter 27 is structured to provide an indication of the amount of charge on the rechargeable storage battery 12. The amp meter 27 may be utilized by an operator of the load controlled battery charging device 10 of the present invention to determine when the charging process is complete.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A load controlled battery charging device structured to operate without a transformer and to apply a direct current charge to a rechargeable storage battery, said device comprising:

an electrical charging circuit comprising a single path series configuration and having an input connection to an alternating current household power supply, wherein the rechargeable storage battery has an output voltage which is less than a peak voltage of the alternating current household power supply, and the peak voltage of the alternating current household power supply is less than 240 volts, a single diode interconnected in series to the alternating current household power supply, said single diode structured to convert the alternating current household power supply to a direct current charging supply, a variable capacity load bank interconnected in series to the alternating current household power supply and said single diode, said variable capacity load bank comprising a plurality of load elements structured and interconnected to one another in a parallel configuration such that a charging current applied to the rechargeable storage battery is controlled by an additive current required for each of said plurality of said load elements interconnected in said parallel configuration, and a charging current output connection interconnected in series to the alternating household current supply, said single diode, and said variable capacity load bank, said charging current output connection structured to interconnect the rechargeable storage battery into said single path series configuration of said electrical charging circuit and to apply said charging current thereto.

2. The device as recited in claim 1 wherein said variable capacity load bank comprises at least one switch structured to interconnect at least one of said plurality of load elements into said parallel configuration.

3. The device as recited in claim 1 wherein said variable capacity load bank comprises at least one switch structured to disconnect at least one of said plurality of load elements from said parallel configuration.

4. A load controlled battery charging device structured to operate without a transformer and to apply a direct current charge to a rechargeable storage battery, said device comprising:

an electrical charging circuit comprising a single path series configuration and having an input connection to an alternating current household power supply, wherein the rechargeable storage battery has an output voltage which is less than a peak voltage of the alternating current household power supply, and the peak voltage of the alternating current household power supply is less than 240 volts, a single diode interconnected in series to the alternating current household power supply, said single diode structured to convert the alternating current household power supply to a direct current charging supply, a variable capacity load bank interconnected in series to the alternating current household power supply and said single diode, said variable capacity load bank comprising a plurality of load elements structured and interconnected to one another such that a charging current applied to the rechargeable storage battery is controlled by a combined current required collectively for said plurality of load elements disposed in said interconnected configuration, and a charging current output connection interconnected in series to the alternating household current supply, said single diode, and said variable capacity load bank, said charging current output connection structured to interconnect the rechargeable storage battery into said single path series configuration of said electrical charging circuit and to apply said charging current thereto.

5. The device as recited in claim 4 wherein said variable capacity load bank comprises at least one switch structured to interconnect at least one of said plurality of load elements into said interconnected configuration.

6. The device as recited in claim 4 wherein said variable capacity load bank comprises at least one switch structured to disconnect at least one of said plurality of load elements from said interconnected configuration.

7. The device as recited in claim 4 wherein at least one of said plurality of load elements comprises an incandescent light bulb.

8. The device as recited in claim 4 wherein the peak voltage of the alternating current household power supply is not greater than 170 volts.

\* \* \* \* \*

UNITED STATES PATENT AND TRADEMARK OFFICE
CERTIFICATE OF CORRECTION

PATENT NO.       : 7,498,770 B1
APPLICATION NO.  : 11/098748
DATED            : March 3, 2009
INVENTOR(S)      : William S. Caldwell, II Page 1 of 1

It is certified that error appears in the above-identified patent and that said Letters Patent is hereby corrected as shown below:

Please correct the Related U.S. Application Data on the Patent Letter Title Page of the above-identified U.S. Patent to read:

Continuation-in-part of U.S. patent application Serial No. 10/877,185, filed on June 28, 2004, now abandoned, which claims the benefit of U.S. provisional patent application Serial No. 60/485,099, filed on July 7, 2003, now abandoned.

Signed and Sealed this

First Day of December, 2009

David J. Kappos
*Director of the United States Patent and Trademark Office*